July 7, 1953  E. C. GREGG, JR  2,644,923
THERMOCOUPLE WATTMETER
Filed July 6, 1950
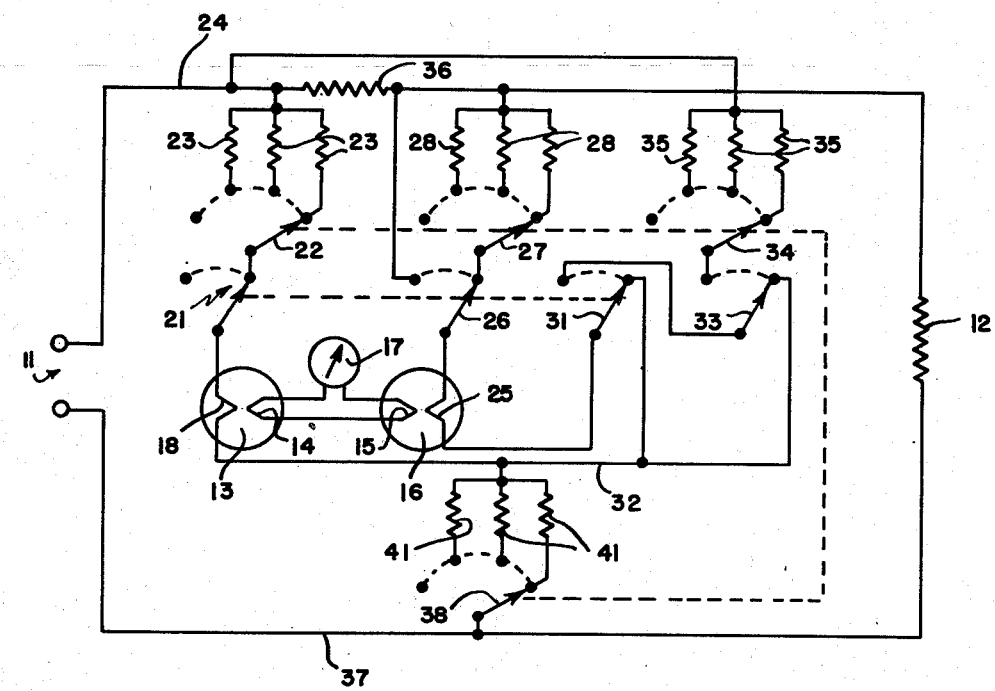
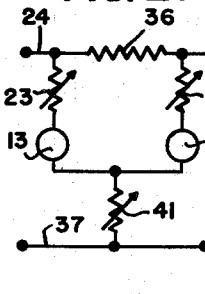
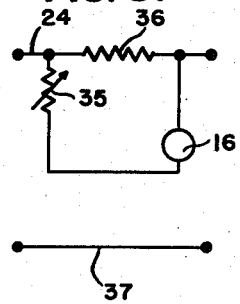
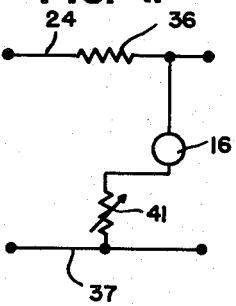
INVENTOR
EARLE C. GREGG, JR.
BY
ATTORNEYS Patented July 7, 1953

2,644,923

UNITED STATES PATENT OFFICE 2,644,923

THERMOCOUPLE WATTMETER

Earle C. Gregg, Jr., East Cleveland, Ohio, assignor to the United States of America as represented by the Secretary of the Navy Application July 6, 1950, Serial No. 172,258

4 Claims. (Cl. 324—106)

The present invention relates to a thermocouple wattmeter and more particularly to a wattmeter which is capable of measuring high frequency electrical power.

The measurement of high frequency electrical power is entirely beyond the capabilities of the ordinary wattmeters which are strictly low frequency devices. In the past, most power measuring circuits initially depended on impedance and current (or voltage) measurements for determining the power into a load device. Since the impedance of many load devices changes with power, these determinations, based on impedance bridge tests at very low levels, could at best only give approximate results. The need consequently, was great to have a means for measuring the actual power input directly. To take care of these needs the present circuit, known as a thermocouple wattmeter, has been developed for the measurement of power over a large frequency range.

The present invention, in addition to power measurements, has the further advantage of being able also to measure current and voltage separately. These two measurements, in conjunction with observations of the power, allow a calculation of the load impedance. Another advantage of the invention is the feature whereby the power range switch tends to keep the impedance constant.

Not only is the invention direct reading, but the wattmeter will read total power independent of waveform and has three power ranges; namely, 100 watts, 500 watts, and 1000 watts full scale. The calculated and measured scale factors agree within 1.5 percent over the frequency range from 0 to 100 kc. and the meter is designed to operate for load impedances in the range from 10 ohms to 300 ohms.

An object of the present invention is the provision of a direct reading wattmeter for measuring power at high frequencies.

Another object is to provide a wattmeter which not only measures power, but will also measure current and voltage separately.

A further object is to provide a wattmeter which maintains its impedance substantially constant for all ranges.

A final object of the invention is the provision of a wattmeter which by measuring power, current, and voltage permits the calculation of the load impedance.

Other objects and features of the invention will become apparent to those skilled in the art as the disclosure is made in the following detailed description of a preferred embodiment of the invention as illustrated in the accompanying drawings in which:

Fig. 1 is a schematic diagram of the circuit of the invention.

Fig. 2 is a functional diagram showing the circuit elements utilized when measuring power.

Fig. 3 is a diagram showing which circuit elements are used to measure current alone.

Fig. 4 is a diagram showing which circuit elements are used to measure voltage alone.

Referring now to the drawings wherein like reference characters designate like or corresponding parts throughout the several views there is shown in Fig. 1 a potential circuit 11 supplying a load 12. Connected into a circuit 11 for measuring the power taken by load 12 as well as its voltage and current is the wattmeter of the present invention wherein a thermocouple 13 has one of its electrodes 14 connected in series with a similar electrode 15 of a second thermocouple 16, there also being in series with electrodes 14 and 15 a microammeter 17. The meter 17 may be calibrated to read directly in watts, volts, or amperes depending upon which of these quantities is being measured.

Directly connected to the second electrode 18 of thermocouple 13 is a two-position switch 21 which is arranged to measure power in one of its positions and voltage and current in the other position. In series with switch 21 is a four-position switch 22 which acts to connect any one of the parallel range resistors 23 to power line 24.

The second electrode 25 of thermocouple 16 is directly connected to a two-position switch 26 which may connect the thermocouple 16 directly to power line 24 in one position or else to a four-position switch 27 in the other position. Switch 27, in turn, is used to select one of the parallel range resistors 28, the common end of which is joined to power line 24.

Also directly connected to electrode 25, of thermocouple 16, is a second two-position switch 31, which, it is to be noted, is ganged together with switches 21 and 26. One position of switch 31 is directly tied to line 32 which is joined to electrode 18 of thermocouple 13, while the other position of the switch goes to the arm of another two-position switch 33. Switch 33 acts to connect switch 31 to line 32 when voltage across the load 12 is being measured, or else to connect switch 31 to four-position switch 34 when current through load 12 is being measured. It is to be noted that switch 34 is similar to switches 22 and 27 and is ganged to them; it acting to select one of the parallel range resistors 35, the common terminal of which is tied to power line 24 where it joins the common terminal of resistors 23. Placed in series, in the line 24, and positioned between the connections to resistors 23 and 28, is a small shunt resistor 36 whose purpose will be more fully described hereinafter.

The other power line 37 has joined to it the arm of a fourth four-position switch 38 which, as can be clearly seen in Fig. 1, is ganged to operate in unison with switches 22, 27, and 34. The purpose of switch 38 is to insert any one of the resistors 41 between line 32 and line 37.

The functional diagrams of Figs. 2, 3, and 4 illustrate which of the circuit components are in operation when the device is used to measure power, current, and voltage respectively, and these diagrams will be more fully described hereinafter.

In operation, when the power delivered to load 12 is being measured, the various switches are positioned as shown in Fig. 1 and the components in effective use are shown in Fig. 2. As stated previously, the parallel-connected resistors 23, 28, 35, and 38 are range resistors; there being one of each group in use when any of the 100, 500, or 1000 watt ranges are employed, but for the present description assume that the connections are as shown. Therefore, when power is being measured there is a completed circuit as follows: from line 24 through resistor 23, switch 22, switch 21, electrode 18, line 32, resistor 41, switch 38 to line 37, with another branch of the circuit from line 24, resistor 28, switch 27, switch 26, electrode 25, switch 31, line 32, to resistor 41. It is to be noted from Fig. 2 that the power circuit is essentially Y-shaped, with the open legs connected to either side of resistor 36. If the current in the load 12 is represented by I, and the voltage across 12 as E, then the current through one leg of the Y circuit will be equal to their sum and current through the other leg will be equal to their difference.

Fig. 4 shows the circuit components employed when voltage alone is measured, and in this situation the ganged switches 22, 27 and 34, as well as switch 33, remain in the position shown. However, ganged switches 21, 26 and 31 are now shifted to the left. This cuts out thermocouple 13 leaving a circuit from line 24 at the right hand end of resistor 36, through switch 26, electrode 25, switch 31, switch 33, line 32, resistor 41, back to line 37. Thermocouple 16 is now in series with resistor 41 and connected in parallel with load 12 right across the power lines 24 and 37, so as to measure the voltage applied to the load.

When the current taken by load 12 is measured the circuit is shown by Fig. 3 and the resistor 36, in series in line 24, acts as a shunt to obtain a small current which is representative of the load current. Here, ganged switches 21, 26 and 31, as well as switch 33, are now activated to the left, with switches 22, 27 and 34 in the position shown. Thermocouple 13 is again cut out and existing circuit consists of line 24, right end of resistor 36, switch 26, electrode 25, switch 31, switch 33, switch 34, resistor 35, back to line 24 at the left end of resistor 36. It will be observed that thermocouple 16 and resistor 35 are now in series, and connected parallel to the shunt resistor 36. Therefore, in measuring the current through resistor 36, the current flowing through the load is obtained.

It can be clearly seen from the above disclosure that the present invention provides a convenient means for measuring power, voltage, and current irrespective of wave form, and at relatively high frequencies. Also that once these elements are known, it is a mere matter of calculation to determine the load impedance. The wattmeter is direct reading, possesses a high degree of accuracy and represents a marked improvement over similar instruments in the prior art.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What is claimed is:

1. In combination with a power circuit, a resistor in series with a first power lead, a pair of thermocouples for producing a current proportional to the power, one electrode of each thermocouple being connected in series through an indicator, one terminal of the second electrode of each thermocouple being connected to an adjustable resistor respectively, each of said adjustable resistors being connected to a different end of the series resistor in the first power lead, the second terminals of said second electrodes connected together to a third adjustable resistor, and said third adjustable resistor being connected to the second power lead, whereby said indicator gives a measure of the power.

2. The power circuit of claim 1 wherein there is provided a fourth adjustable resistor connected between said first power lead and said second electrodes, and switches which act to cut out one thermocouple and a portion of the adjustable resistors when said indicator indicates current in the circuit.

3. The power circuit of claim 1 wherein there are switches which act to cut out one thermocouple and a portion of the adjustable resistors when said indicator indicates voltage whereby the remaining thermocouple and third adjustable resistor are connected in series across the power circuit.

4. Electric measuring apparatus for power, voltage, and current comprising a plurality of thermocouples each having a heater element and a current generating electrode, a current indicating device in series connection with said current generating electrodes, a first resistor adapted to be connected in series with one lead from a power source to a load, a first group of resistors having an end of each resistor commonly connected to one side of said first resistor, a second group of resistors having an end of each resistor commonly connected to the other side of said first resistor, a third group of resistors having an end of each resistor commonly connected to said one side of said first resistor, first switching means comprising a first set of ganged single-bladed multi-poled switches, a plurality of said switches having their poles respectively associated with the other ends of said resistors of the three said groups of resistors, second switching means comprising a set of ganged switches for connecting and disconnecting said blades of said first switching means to one side of said heater elements, further resistor means connected to the other side of one of said heater elements and adapted to be tied to a return lead from said load to said power source, through a switch of said first switching means, a single switch for connecting together a switch of said first and second switching means, said single switch and a pair of switches of said second switching means being connected for selectively connecting a side of the second of said heater elements to said further resistor means or to said third group of resistors, one of said pair of switches being connected for connecting the last said side of said second heater element to said other side of said first resistor.

EARLE C. GREGG, JR.

References Cited in the file of this patent

UNITED STATES PATENTS

| Number | Name | Date |
|---|---|---|
| 1,586,533 | Peterson | June 1, 1926 |
| 2,059,594 | Massa | Nov. 3, 1936 |
| 2,277,365 | Michael | Mar. 24, 1942 |
| 2,316,153 | Brown | Apr. 13, 1943 |
| 2,512,927 | Freas | June 27, 1950 |

OTHER REFERENCES

Publication I, RCA Reprint from Proceedings of the IRE, August 1943, Direct Reading Wattmeters for Use at Radio Frequencies, page 404, Fig. 3.